United States Patent
Matsui et al.

(10) Patent No.: US 7,239,855 B2
(45) Date of Patent: Jul. 3, 2007

(54) COMMUNICATION SEMICONDUCTOR INTEGRATED CIRCUIT DEVICE AND WIRELESS COMMUNICATION SYSTEM

(75) Inventors: Hiroaki Matsui, Takasaki (JP); Kazuaki Hori, Totsuka (JP)

(73) Assignee: Renesas Technology Corporation, Tokyo (JP)

( * ) Notice: Subject to any disclaimer, the term of this patent is extended or adjusted under 35 U.S.C. 154(b) by 334 days.

(21) Appl. No.: 10/816,817

(22) Filed: Apr. 5, 2004

(65) Prior Publication Data

US 2004/0229592 A1 Nov. 18, 2004

(30) Foreign Application Priority Data

May 13, 2003 (JP) .............................. 2003-133875

(51) Int. Cl.
*H04B 1/04* (2006.01)
(52) U.S. Cl. .............................. 455/127.1; 455/127.2; 455/188; 455/102
(58) Field of Classification Search ............. 455/114.2, 455/102, 112, 127.1, 127.2, 127.3, 118, 114.1, 455/232.1, 234.1, 76; 375/345
See application file for complete search history.

(56) References Cited

U.S. PATENT DOCUMENTS

| 4,549,312 | A | * | 10/1985 | Michaels et al. ............ 455/118 |
| 4,554,548 | A | * | 11/1985 | Brilman et al. ........... 455/232.1 |
| 5,564,076 | A | * | 10/1996 | Auvray ..................... 455/190.1 |
| 5,732,334 | A | * | 3/1998 | Miyake ..................... 455/127.2 |
| 5,949,286 | A | * | 9/1999 | Jones ........................ 455/127.3 |
| 6,498,852 | B2 | * | 12/2002 | Grimani ................... 455/127.2 |
| 6,798,844 | B2 | * | 9/2004 | Ratto .......................... 444/126 |
| 7,027,793 | B2 | * | 4/2006 | Gard et al. .............. 455/127.1 |
| 2002/0137536 | A1 | * | 9/2002 | Aisaka et al. ............ 455/127.1 |
| 2003/0039129 | A1 | * | 2/2003 | Miyazaki et al. .............. 455/76 |
| 2004/0198257 | A1 | * | 10/2004 | Takano t al. ................. 455/102 |

FOREIGN PATENT DOCUMENTS

| JP | 2000-13246 | 1/2000 |
| JP | 2002-94331 | 3/2002 |

* cited by examiner

*Primary Examiner*—Lana N. Le
(74) *Attorney, Agent, or Firm*—Mattingly, Stanger, Malur & Brundidge, P.C.

(57) ABSTRACT

A communication semiconductor integrated circuit device is capable of transmission in two or more different modulation modes and outputting transmission signals with less distortion. The communication semiconductor integrated circuit device comprises a gain variable amplification circuit which amplifies I-signals and Q-signals; and a mixer circuit which synthesizes the amplified I-signals and Q-signals and local oscillation signals to carry out modulation and frequency conversion. The communication semiconductor integrated circuit device is capable of transmission in two or more different modulation methods, for example, in GSM mode and EDGE mode. A low-pass filter of second or higher order is placed between the gain variable amplification circuit and the mixer circuit.

5 Claims, 6 Drawing Sheets

COMMUNICATION SEMICONDUCTOR INTEGRATED CIRCUIT DEVICE AND WIRELESS COMMUNICATION SYSTEM

CROSS-REFERENCE TO RELATED APPLICATION

The present application claims priority from Japanese patent application JP 2003-133875 filed on Mar. 13, 2003, the content of which is hereby incorporated by reference into this application.

BACKGROUND OF THE INVENTION

The present invention relates to a technology which is effectively applied to a transmitter circuit in a communication semiconductor integrated circuit device constituting a wireless communication system and further a transmitter circuit of such a modulation method that phase modulation and amplitude modulation are carried out. More particularly, the present invention relates to a technology effectively utilized in a transmitter circuit of direct up conversion type wherein a modulator which carries out modulation into an oscillation signal (carrier wave) on a predetermined frequency by I-signal and Q-signal carries out direct conversion into transmission frequency.

Conventionally, various cellular phones have been proposed. One example is a dual band cellular phone capable of handling signals in two frequency bands, for example, GSM (Global System for Mobile Communication) signals in the 900-MHz band and DCS (Digital Cellular System) signals in the 1800-MHz band. Recently, demand has grown for a triple band cellular phone capable of handling, for example, PCS (Personal Communication System) signals in the 1900-MHz band in addition to the GSM and DCS signals. For high frequency ICs used in a cellular phone supporting a plurality of bands, sharing of VCO is effective in terms of reduction of a number of parts.

The conventional GSM, DCS, and PCS use a phase modulation method designated as GMSK (Gaussian Minimum Shift Keying) wherein only the phase of carrier waves is shifted according to transmission data. As a one-chip high frequency IC which supports only GSMK modulation and is capable of transmitting triple band signals, one based on a method designated as offset PLL has been already brought into practical use.

The offset PLL transmitter circuit modulates an I-signal and a Q-signal by an oscillation signal on an intermediate frequency (fIF). Thereafter, the offset PLL transmitter circuit supplies an oscillation signal on a higher frequency (fRF) than that of the carrier wave and an oscillation signal (fTX) for transmission outputted from a transmission oscillation circuit (TXVCO). The transmitter circuit supplies these oscillation signals to a mixer designated as offset mixer, and causes the mixer to output a signal corresponding to the difference (fRF−fTX) in frequency between the two signals. Then, the oscillating operation of the TXVCO is feedback-controlled so that the frequency of this differential signal is matched with the frequency of the modulating signal. In this method, both transmission signals in the 900-MHz band and transmission signals in the 1800-MHz band can be coped with by one RFVCO by varying the frequency dividing ratio of the RF signal supplied from the mixer. Therefore, the method is excellent in terms of reduction of a number of parts.

For recent cellular phones, the EDGE (Enhanced Data Rates for GSM Evolution) method has been proposed. In the EDGE method, communication of audio signals is carried out by GMSK modulation, and data communication is carried out by 3π/8 rotating 8-PSK (Phase Shift Keying) modulation. The 8-PSK modulation is modulation wherein amplitude shift is added to phase shift of carrier waves in the GMSK modulation. While information of one bit is sent per symbol in the GMSK modulation, information of three bits can be sent per symbol in the 8-PSK modulation. For this reason, the EDGE method can carry out communication at a higher transmission rate than the GSM method.

However, in the offset PLL transmitter circuit, when the control terminal of TXVCO is supplied with a feedback signal, the oscillation frequency is changed but the oscillation amplitude is constant. Therefore, though the offset PLL method is suitable for a transmitter circuit supporting GSM which carries out only phase modulation (GMSK modulation) it cannot be applied to a transmitter circuit supporting EDGE involving amplitude modulation.

One of methods for implementing a modulation method wherein both the phase component and the amplitude component of a transmission signal are made to bear information is polar loop. The polar loop method is such that: a signal to be transmitted is separated into a signal containing a phase component and a signal containing an amplitude component. Thereafter, they are controlled by feedback by phase control loop and amplitude control loop, respectively, and then synthesized in an amplifier and outputted. However, the polar loop transmitter circuit has a problem. Since the transmitter circuit is provided with two control loops, phase loop and amplitude loop, its control system is complicated. This makes it difficult to reduce the size of a high frequency IC chip and its cost.

Other methods for implementation include two-step up conversion and direct up conversion. In the two-step up conversion, an I-signal and a Q-signal are modulated by a signal on an intermediate frequency (IF), and then converted into transmission frequency. In the direct up conversion, an I-signal and a Q-signal are directly modulated by a signal on a transmission frequency. The inventions related to such methods are disclosed in, for example, Patent Document 1 and Patent Document 2.

[Patent Document 1]
Japanese Patent Application Laid-Open No. 2000-013246
[Patent Document 2]
Japanese Patent Application Laid-Open No. 2002-094331

SUMMARY OF THE INVENTION

The invention disclosed in Patent Document 1 is such that a gain variable amplifying means whose gain is controllable is provided in the stages preceding and subsequent to a frequency converting means. Thus, the gain of one or both of the amplifying means is controlled according to the modulation method. The invention disclosed in Patent Document 2 is such that a gain variable amplifier is provided in the stage subsequent to a frequency converter (mixer), and its gain is controlled according to the mode, GSM mode or EDGE mode.

No description of forming a modulator, a frequency converter, and a gain variable amplifier over one and the same semiconductor chip is found in either of the two documents. That is, it seems that both the inventions are on the assumption that the modulator, frequency converter, a gain variable amplifier are would be formed over separate semiconductor chips.

However, when a frequency converter and a gain variable amplifier are formed over the same semiconductor chip as a modulator is, a problem arises. The spacing between the circuits is very narrow, and greater care must be given to the following points: unwanted waves (spurious) produced by signal interference between circuits, amplifier gain control, and the like, wave interference noise from an oscillator (VCO), harmonic component produced at a gain variable amplifier, a modulator, or a frequency converter, and the like. When a reception system circuit and a transmission system circuit are formed over one and the same chip, care must be also given to noise which leaks to a reception band away by 20 MHz from a carrier wave for transmission.

For example, if a gain variable amplifier is not favorable in linear characteristics, a problem arises. If distortion is produced in a amplitude component by an unwanted wave due to signal interference, that distortion is converted into distortion in phase component. Therefore, the modulation accuracy of a modulator is degraded, or distortion in a transmission signal is increased. Neither Patent Document 1 or Patent Document 2 gives consideration to this problem. In the inventions disclosed in Patent Documents 1 and 2, a modulator and a frequency converter are constituted as separate circuits. Therefore, even if they are formed over one semiconductor chip, a problem of increased chip size results.

An object of the present invention is to provide a communication semiconductor integrated circuit device capable of transmission in two or more modulation modes and outputting transmission signals with less distortion.

Another object of the present invention is to provide a communication semiconductor integrated circuit device which is capable of transmission in two or more modulation modes and allows reduction in size.

A further object of the present invention is to provide a communication semiconductor integrated circuit device capable of transmission in two or more modulation modes and with less leakage power to the reception band or adjacent channels.

The above and other objects and novel features of the present invention will become apparent from the following description and the accompanying drawings.

Representative aspects of the present invention disclosed in this specification will generally described below:

A communication semiconductor integrated circuit device comprises a gain variable amplification circuit which amplifies I-signals of in-phase component and Q-signals of quadrature component with respect to fundamental wave; and a mixer circuit as signal synthesis circuit which synthesizes the amplified I-signals and Q-signals and local oscillation signals to carry out modulation and frequency conversion. The communication semiconductor integrated circuit device is capable of transmission in two modulation modes: for, example, GSM mode in which only phase modulation is carried out, and EDGE mode in which phase modulation and amplitude modulation are carried out. In this communication semiconductor integrated circuit device, a low-pass filter of second or higher order is placed between the gain variable amplification circuit and the mixer circuit.

According to the above-mentioned means, unwanted waves produced by signal interference between circuits or gain control in a gain variable amplification circuit can be reduced. Thus, a transmission signal with high modulation accuracy and less distortion can be outputted, and leakage power to the reception band or adjacent channels can be reduced.

Preferably, an amplification circuit having a limiter function and again variable amplification circuit are provided in the stage next to the mixer circuit. Thus, in modulation mode, such as GSM mode, in which only phase modulation is carried out, a modulated signal is amplified through the amplification circuit having the limiter function; in modulation mode, such as EDGE mode, involving phase modulation and amplitude modulation, a modulated signal is amplified through the gain variable amplification circuit and outputted from it.

As a result, a circuit provided with a modulating function and a frequency converting function can be used in common in transmissions in different frequency bands, and thus the chip size can be reduced. Further, this prevents amplitude distortion from being converted into phase distortion through the power amplification circuit in the later stage in GSM mode and thus the accuracy of transmission signals from being degraded.

DETAILED DESCRIPTION OF THE PREFERRED EMBODIMENTS

Figure 1:
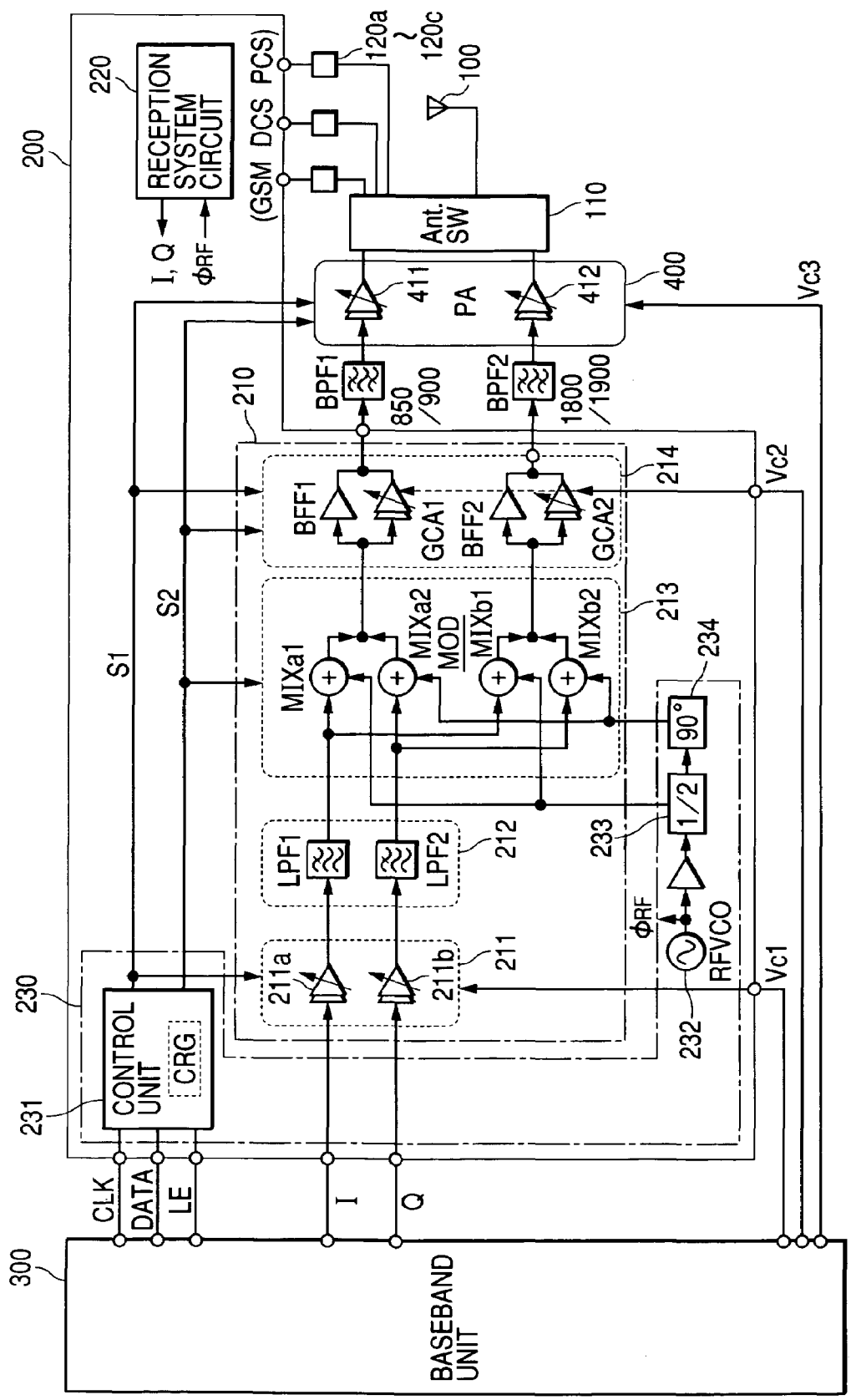
FIG. 1 is a block diagram illustrating an example of the configuration of a communication semiconductor integrated circuit device (high frequency IC) capable of transmission in two modulation methods, GSM mode and EDGE mode, in a first embodiment of the present invention and a wireless communication system using it.

Referring to the drawings, the preferred embodiments of the present invention will be described below.

FIG. 1 is a block diagram illustrating an example of the configuration of the communication semiconductor integrated circuit device (high frequency IC) capable of transmission in two modulation methods, GSM mode and EDGE mode, in an embodiment of the present invention and a wireless communication system using it.

The wireless communication system in FIG. 1 comprises an antenna 100 for transmitting and receiving signal waves; a switch 110 for switching between transmission and reception; high frequency filters 120a to 120c comprising SAW filters and the like for removing unwanted waves from reception signals; a high frequency IC 200 for demodulating reception signals and modulating transmission signals; a baseband circuit (LSI) 300 for converting transmission data into I- and Q-signals and controlling the high frequency IC 200; a high frequency power amplifier 400 which amplifies the power of transmission signals modulated and frequency-converted at the high frequency IC 200, and outputs the amplified signals to the antenna; and the like.

The high frequency IC 200 is formed as semiconductor integrated circuit over one semiconductor chip. The baseband circuit 300 is constituted of a microprocessor and the like. The high frequency power amplifier 400 is constituted as module by mounting power amplifiers 411 and 412, bias circuits for them, an impedance matching circuit, and the like over an insulating substrate, such as ceramic substrate.

The high frequency IC 200 in this embodiment is so constituted that signals can be modulated and demodulated by transmission methods, GSM850, GSM900, DCS1800, and PCS1900, though its constitution is not limited to this. In correspondence with this, the wireless communication system in this embodiment comprises: the filter 120a which passes reception signals in the frequency band for GSM; the filter 120b which passes reception signals in the frequency band for DCS1800; and the filter 120c which passes reception signals in the frequency band for PCS1900.

The high frequency IC 200 in this embodiment is roughly constituted of a transmission system circuit 210, a reception system circuit 220, and a control system circuit 230 comprising a circuit common to the transmission and reception systems. FIG. 1 depicts the transmission system circuit 210 in detail. The control system circuit 230 includes a control circuit 231 which generates control signals internal to the chip; a local oscillation circuit 232; a frequency dividing circuit 233; a phase shifting circuit 234 which generates signals whose phase is shifted by 90°; and the like. The local oscillation circuit 232 comprises VCO (Voltage Controlled Oscillation circuit) capable of generating oscillation signals on 3296 to 3820 MHz required for transmission and oscillation signals φRF on 3476 to 3980 MHz required for reception. Thus, the local oscillation circuit 232 is provided as a circuit common to transmission and reception.

The transmission system circuit 210 comprises a first amplifying unit 211 comprising gain variable amplifiers 211a and 212b which amplify I-signals and Q-signals, respectively, supplied from the baseband circuit 300; a filter unit 212 comprising low-pass filters LPF1 and LPF2 which remove harmonic components from the amplified I-signals and Q-signals; a modulating-frequency converting unit 213 comprising quadrature modulation mixers which synthesize the filtered I-signals and Q-signals and orthogonal signals whose phases are different from each other by 90° from the frequency dividing circuit 233 and the phase shifting circuit 234, and simultaneously carry out modulation and up convert; a second amplifying unit 214 which amplifies the modulated signals; and the like.

The low-pass filters LPF1 and LPF2 are provided for removing distortion (harmonic component) produced when I-signals and Q-signals pass through the gain variable amplifiers 211a and 212b and out-of-band noise. For the low-pass filters LPF1 and LPF2, filters of second or higher order are preferably used. With respect to the modulating-frequency converting unit 213, mixers may be used in common for GSM, DCS, and PCS. However, in the high frequency IC 200 in this embodiment, mixers MIXa1 and MIXa2 for GSM850 and GSM900 and mixers MIXb1 and MIXb2 for DCS1800 and PCS1900 are separately provided. Separately providing the mixers facilitates designing of the circuits of the mixers, and makes it possible to provide them with characteristics suitable for signals in the respective frequency bands. As a result, modulation can be carried out with a higher degree of accuracy.

Further, in the high frequency IC 200 in this embodiment, the second amplifying unit 214 in the stage subsequent to the modulating-frequency converting unit 213 is provided with buffers and amplifiers. The buffers are buffers BFF1 and BFF2 having a limiter function for GSM mode involving GMSK modulation; and the amplifiers are gain variable amplifiers GCA1 and GCA2 for EDGE mode involving 8-PSK modulation. The buffer BFF1 and the gain variable amplifier GCA1 are provided in correspondence with the mixers MIXa1 and MIXa2 for GSM850 and GSM900. The buffer BFF2 and the gain variable amplifier GCA2 are provided in correspondence with the mixers MIXb1 and MIXb2 for DCS1800 and PCS1900.

Either of the mixers MIXa1 and MIXa2 and the mixers MIXb1 and MIXb2, either of the buffers BFF1 and BFF2, and either of the gain variable amplifiers GCA1 and GCA2 are selected. Specification of which to select is carried out by a control signal S1 indicating selected mode and a control signal S2 indicating a selected band. The control signals S1 and S2 are outputted by the control circuit 231 according to an instruction from the baseband LSI 300. These control signals S1 and S2 are also supplied to the power module 400 and used there to set the bias points and the like of the power amplifiers though their constitution is not limited to this.

Figure 2:
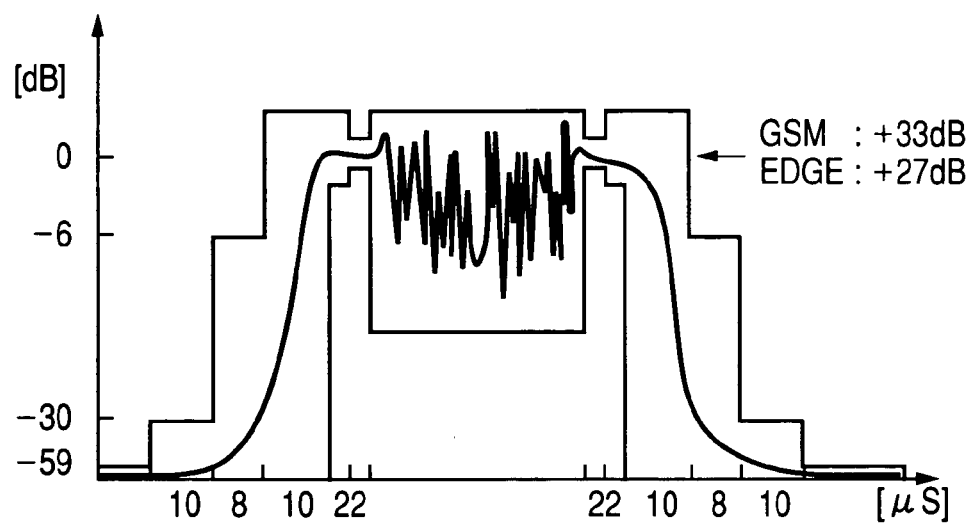
FIG. 2 is an explanatory drawing illustrating a time mask at rise and fall of output power defined in the GSM standard.

Further, control voltages Vc1, Vc2, and Vc3 for controlling gain are supplied from the baseband LSI 300 to the gain variable amplifiers 211a and 211b and GCA1 and GCA2 in the high frequency IC 200 and to the power module 400. The GSM standard specifies that the output power of transmission signals must fall within a predetermined time mask as illustrated in FIG. 2. Therefore, the output level must be raised to a predetermined level within a predetermined time at start of transmission, and must be lowered to a predetermined level within a predetermined time at end of transmission.

In general, conventional wireless communication systems raise and lower the output level within a time mask by controlling the gain of the power amplifiers 411 and 412. The wireless communication system in this embodiment is so constituted that this is implemented by controlling the gain of the gain variable amplifiers 211a and 211b and GCA1 and GCA2 by control voltages Vc1 and Vc2.

In this embodiment, the control voltage Vc3 is a voltage which gives a fixed bias corresponding to requested level to the power amplifiers 411 and 412. However, such a constitution that the output level is raised and lowered by controlling the gain of three circuits (i.e. the gain variable amplifiers 211a and 211b and GCA1 and GCA2 and the power amplifiers 411 and 412) may be adopted.

FIG. 2 illustrates the gain of the output terminals of the high frequency IC 200 as viewed from the antenna end. In GSM mode, 0 dB in FIG. 2 corresponds to +33 dB at the antenna end, and in EDGE mode, 0 dB corresponds to +27 dB at the antenna end.

In addition, the wireless communication system in this embodiment is provided between the high frequency IC 200 and the power module 400 with band-pass filters BPF1 and BPF2. The band-pass filters BPF1 and BPF2 comprise SAW filters and the like and remove unwanted waves from transmission signals modulated and amplified at the high frequency IC 200. The band-pass filter BPF1 passes transmission signals in the frequency band for GSM850 and GSM900, and the band-pass filter BPF2 passes transmission signals in the frequency band for DCS1800 and PCS1900.

The modulating-frequency converting unit 213 is so designed that the following takes place: the frequency component equivalent to the difference between the frequency of synthesized I-signal and Q-signal and the frequency of high frequency oscillation signal φRF become the maximum of the frequency components of output signals. However, if the paired elements constituting a circuit are out of balance in terms of characteristics, problems arise. Such problems include relative increase in the frequency component of carrier wave signals in the output of the modulating-frequency converting circuit 213 and a degraded degree of suppression of unwanted waves. In this embodiment, the band-pass filters BPF1 and BPF2 are provided in the stage subsequent to the modulating-frequency converting circuit 213. As a result, the following advantage is produced: unwanted waves out of the transmission band and harmonic components which can be contained in modulated transmission signals due to variation between paired elements or the like can be suppressed.

In the high frequency IC 200 in this embodiment, the control circuit 231 is provided with a control register CRG, and the register CRG is so constituted that it is set based on signals from the baseband circuit 300. More specifically, the high frequency IC 200 is supplied from the baseband circuit 300 with clock signal CLK for synchronization, data signal DATA, and load enable signal LE as control signal. When the load enable signal LE is asserted and brought into the effective level, the control circuit 231 takes in data signals DATA, transmitted from the baseband circuit 300, in succession in synchronization with the clock signal CLK. Then, the control circuit 231 sets them on the control register CRG. The data signal DATA is transmitted in serial though the constitution of transmission is not limited to this.

The reception system circuit 220 comprises low noise amplifiers which amplify reception signals in the three frequency bands for GSM, DCS, and PCS, respectively; a mixer circuit which mixes the reception signals amplified at the low noise amplifiers with orthogonal signals generated at the frequency dividing circuit 233 and the phase shifting circuit 234 and thereby carries out demodulation and down convert; a high gain amplifying unit which amplifies the demodulated I- and Q-signals and outputs them to the baseband circuit 300; and the like. However, these elements are not shown in the figure.

As mentioned above, the high frequency IC 200 in the embodiment is provided with the low-pass filters LPF1 and LPF2 and the band-pass filters BPF1 and BPF2. The low-pass filters LPF1 and LPF2 are placed in the stage subsequent to the gain variable amplifiers 211a and 211b, and the band-pass filters BPF1 and BPF2 are placed in the stage subsequent to the gain variable amplifiers GCA1 and GCA2. For this reason, spurious produced by adjusting the gain of the gain variable amplifiers 211a, 211b, GCA1, and GCA2 can be removed by filters. Thus, distortion in transmission signals can be reduced.

Figure 3A:
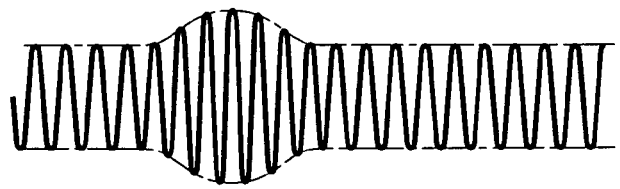
FIGS. 3(A) to 3(C) are waveform diagrams illustrating examples of the waveform of signals modulated by the GMSK modulation method and the 8-PSK modulation method.

Further, the high frequency IC 200 in this embodiment is provided with the buffers BFF1 and BFF2 having a limiter function in the stage subsequent to the modulating-frequency converting circuit 213. In GSM mode (GMSK modulation), the buffers BFF1 and BFF2 are selected instead of the gain variable amplifiers GCA1 and GCA2. In GSM mode, amplitude modulation is not carried out, and the output signal of the modulating-frequency converting circuit 213 is fundamentally constant in amplitude. However, if noise, spurious, or harmonics are contained, its amplitude fluctuates as illustrated in FIG. 3(A).

Figure 3B:
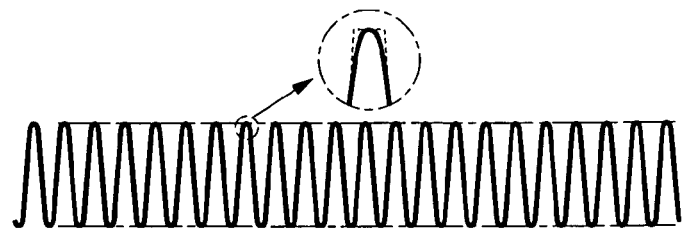

Modulated signals pass through the buffers BFF1 and BFF2 having a limiter function, whereby the signals are shaped into signals of constant amplitude as illustrated in FIG. 3(B). When the linear characteristics of the power amplifiers 411 and 412 in the later stage are not favorable, a problem that the amplitude distortion in an input signal is converted into phase distortion. However, by making pass the modulated signals through the buffers BFF1 and BFF2 having a limiter function, as in this embodiment, the signals are shaped into signals of constant amplitude as illustrated in FIG. 3(B). Therefore, an amplitude component is prevented from being converted into a phase component, and transmission signals high in phase accuracy can be outputted.

Figure 3C:
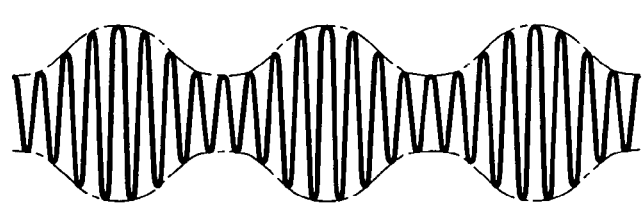

When the buffers BFF1 and BFF2 are ideal limiters, their output is in such waveform as obtained by cutting a sine wave at the limiter level, as indicated by a broken line in the enlarged portion of FIG. 3(B). In reality, however, the waveform is made dull and smooth due to the influences of parasitic resistance, parasitic capacitance, and the like, as indicated by a solid line, because the frequency of the signals is high. The buffer having a limiter function is publicly known, and an concrete example of its circuit is not shown. However, the buffer can be constituted of a differential amplification circuit wherein a diode for clamp is connected between an output node and a supply voltage terminal, and the like. FIG. 3(C) is a waveform chart showing the waveform of a transmission signal in EDGE mode involving amplitude modulation.

Figure 4:
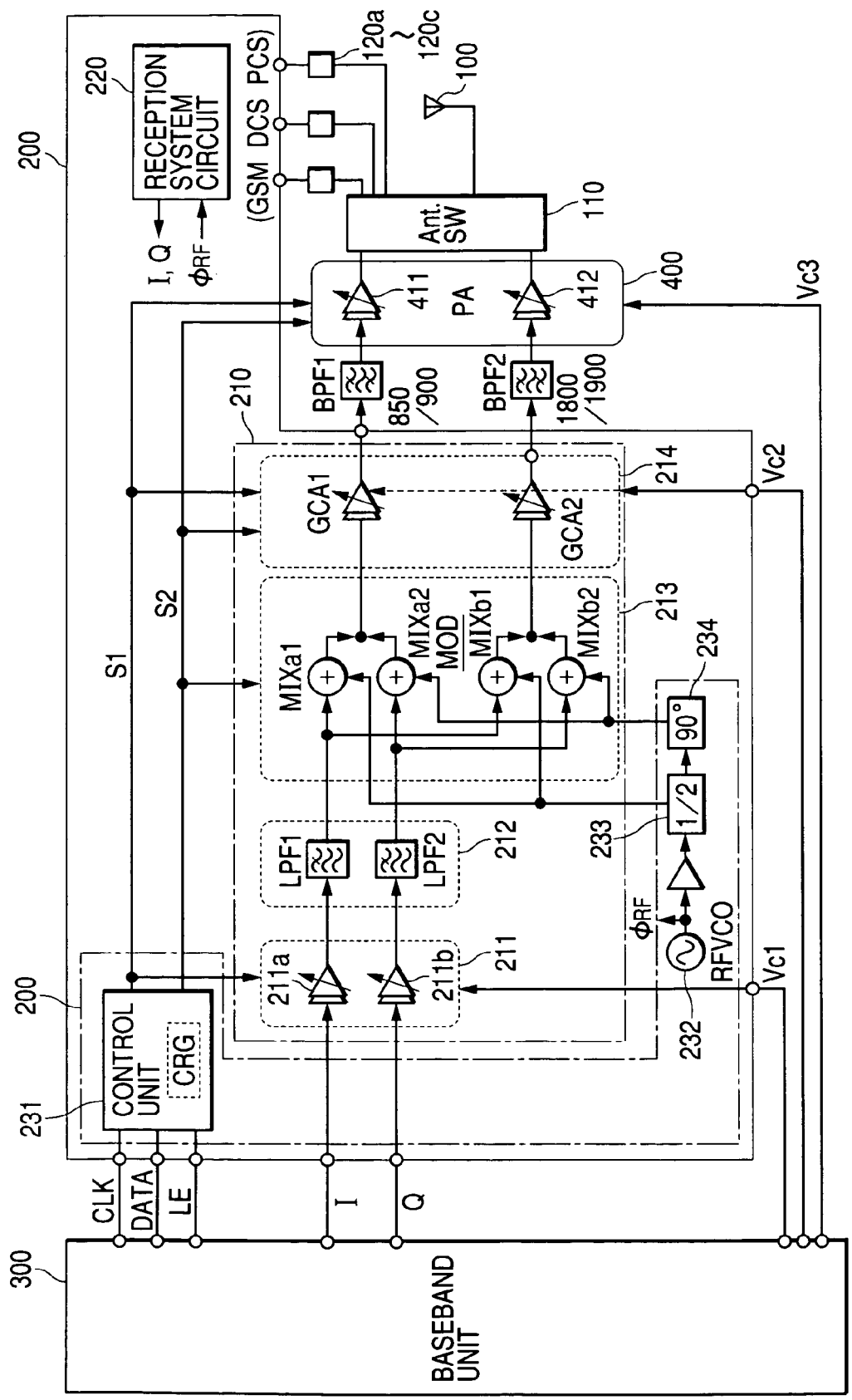
FIG. 4 is a block diagram illustrating an example of the configuration of a high frequency IC in a second embodiment of the present invention and a wireless communication system using it.

FIG. 4 illustrates an example of the configuration of the high frequency IC in the second embodiment of the present invention and a wireless communication system using it.

In the second embodiment, the buffers BFF1 and BFF2 having a limiter function in the first embodiment are omitted. Instead, only the gain variable amplifiers GCA1 and GCA2 are provided as the second amplifying unit 214 in the stage subsequent to the modulating-frequency converting unit 213. For the rest, the constitution is the same as that of the first embodiment. In this embodiment, modulated signals are amplified and outputted by the gain variable amplifier GCA1 and GCA2 in GSM mode as well as in EDGE mode.

The second embodiment obviates the buffers BFF1 and BFF2. Therefore, in the second embodiment, the scale of the circuitry is accordingly reduced as compared with the embodiment in FIG. 1, and the chip size can be reduced. Further, the first amplifying unit 211, filter unit 212, and modulating-frequency converting unit 213 preceding the second amplifying unit 214 may be constituted of circuits having more favorable characteristics as compared with those in FIG. 1. More specifically, they may be constituted of circuits which allow reduction in fluctuation in the amplitude of input signals to the second amplifying unit 214. In this case, even if the buffers BFF1 and BFF2 are omitted, substantially the same transmission signals with less distortion as in the embodiment in FIG. 1 can be outputted.

As mentioned above, signals can be amplified through the second amplifying unit 214 in GSM mode as well. Therefore, the gain is provided to the first amplifying unit 211 in the first embodiment can be shared between the first amplifying unit 211 and the second amplifying unit 214 in the second embodiment. Thus, the gain of the first amplifying unit 211 can be reduced by the amount assigned to the second amplifying unit 214. As a result, amplitude fluctuation and distortion in signals inputted to the second amplifying unit 214 can be reduced.

Further, band-pass filters having more favorable characteristic than BPF1 and BPF2 in the first embodiment may be used as the band-pass filters BPF1 and BPF2 in the later stage. Thus, without use of the buffers BFF1 and BFF2 having a limiter function, transmission signals with relatively less distortion can be similarly inputted to the power module 400 in GSM mode.

Figure 5:
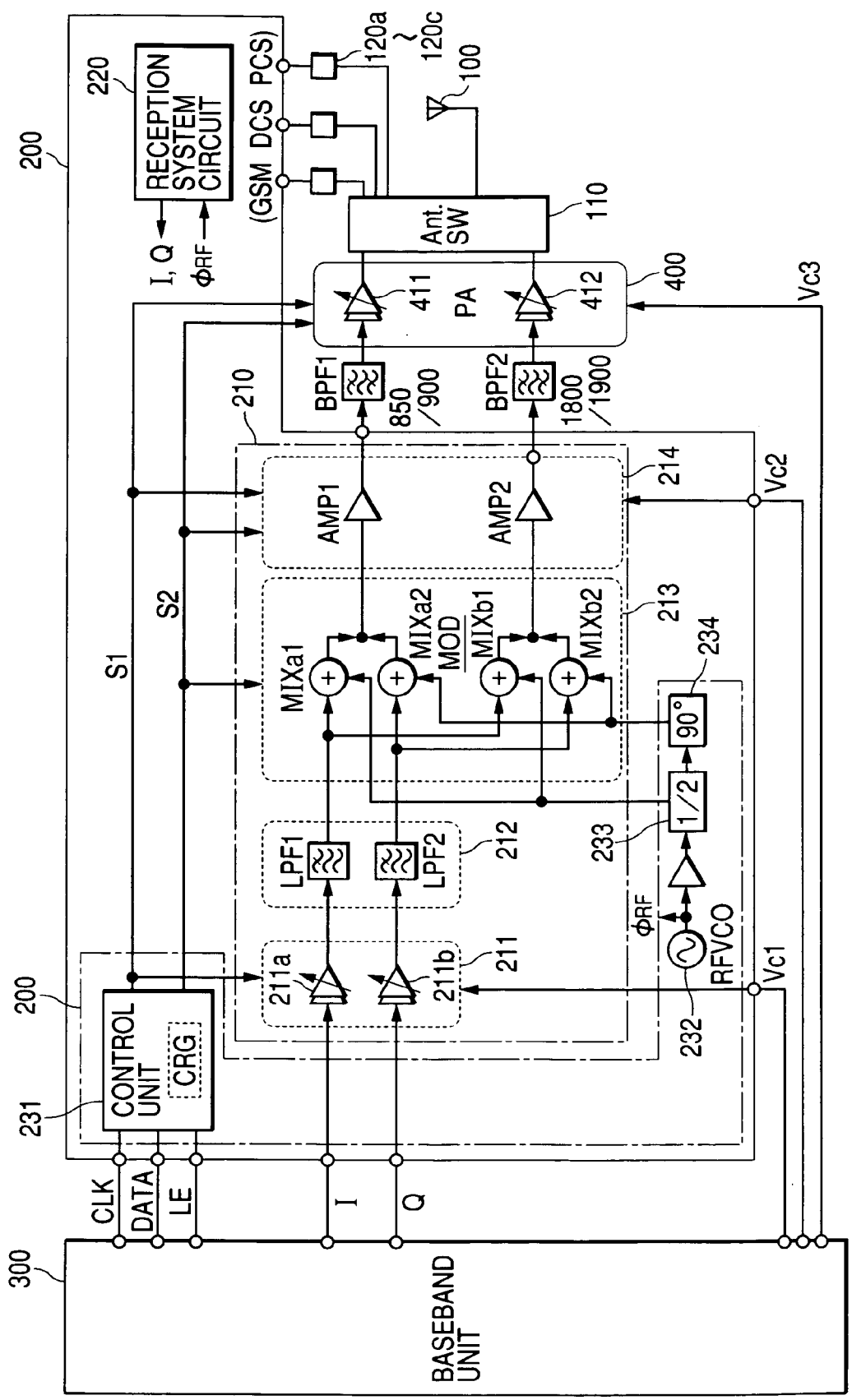
FIG. 5 is a block diagram illustrating an example of the configuration of a high frequency IC in a third embodiment of the present invention and a wireless communication system using it.

FIG. 5 illustrates an example of the configuration of the high frequency IC in the third embodiment of the present invention and a wireless communication system using it.

In the third embodiment, the gain variable amplifiers GCA1 and GCA2 in the second embodiment are omitted. Instead, the third embodiment is provided with linear amplifiers AMP1 and AMP2 of fixed gain as the second amplifying unit 214 in the stage subsequent to the modulating-frequency converting unit 213. For the rest, the constitution is the same as that of the second embodiment. In this embodiment, the output level is raised by controlling the gain of the gain variable amplifiers 211a and 211b in the first amplifying unit 211 at start of transmission in GSM mode as well as in EDGE mode.

The third embodiment requires gain variable amplifiers 211a and 211b of a wider range of gain variation than in the first embodiment. However, the buffers BFF1 and BFF2 are unnecessary, and the scale of the circuitry is accordingly reduced as compared with the embodiment in FIG. 1. As a result, the chip size can be reduced.

The input signal of the second amplifying unit 214 is higher in frequency than the input signal of the first amplifying unit 211. Therefore, the gain variable amplifiers in the second amplifying unit is larger in current consumption than the gain variable amplifiers in the first amplifying unit. However, since the third embodiment uses the linear amplifiers AMP1 and AMP2 instead of the gain variable amplifiers GCA1 and GCA2 in the second amplifying unit 214, the following advantage is produced: in the third embodiment, the current consumption of the entire chip can be significantly reduced as compared with the first and second embodiments.

As is the case with the second embodiment, the first amplifying unit 211, filter unit 212, and modulating-frequency converting unit 213 in the stages preceding the second amplifying unit 214 may be constituted as circuits having more favorable characteristics than in FIG. 1. More specifically, they may be constituted as circuits which allow reduction in fluctuation in the amplitude of input signals to the second amplifying unit 214. In this case, even if the buffers BFF1 and BFF2 having a limiter function are omitted, substantially the same transmission signals with less distortion as in the embodiment in FIG. 1 can be outputted.

Further, band-pass filters having more favorable characteristics than BPF1 and BPF2 in the first embodiment may be used as the band-pass filters BPF1 and BPF2 in the later stage. Thus, without use of the buffers BFF1 and BFF2 having a limiter function, transmission signals with relatively less distortion can be similarly inputted to the power module 400 in GSM mode.

Figure 6:
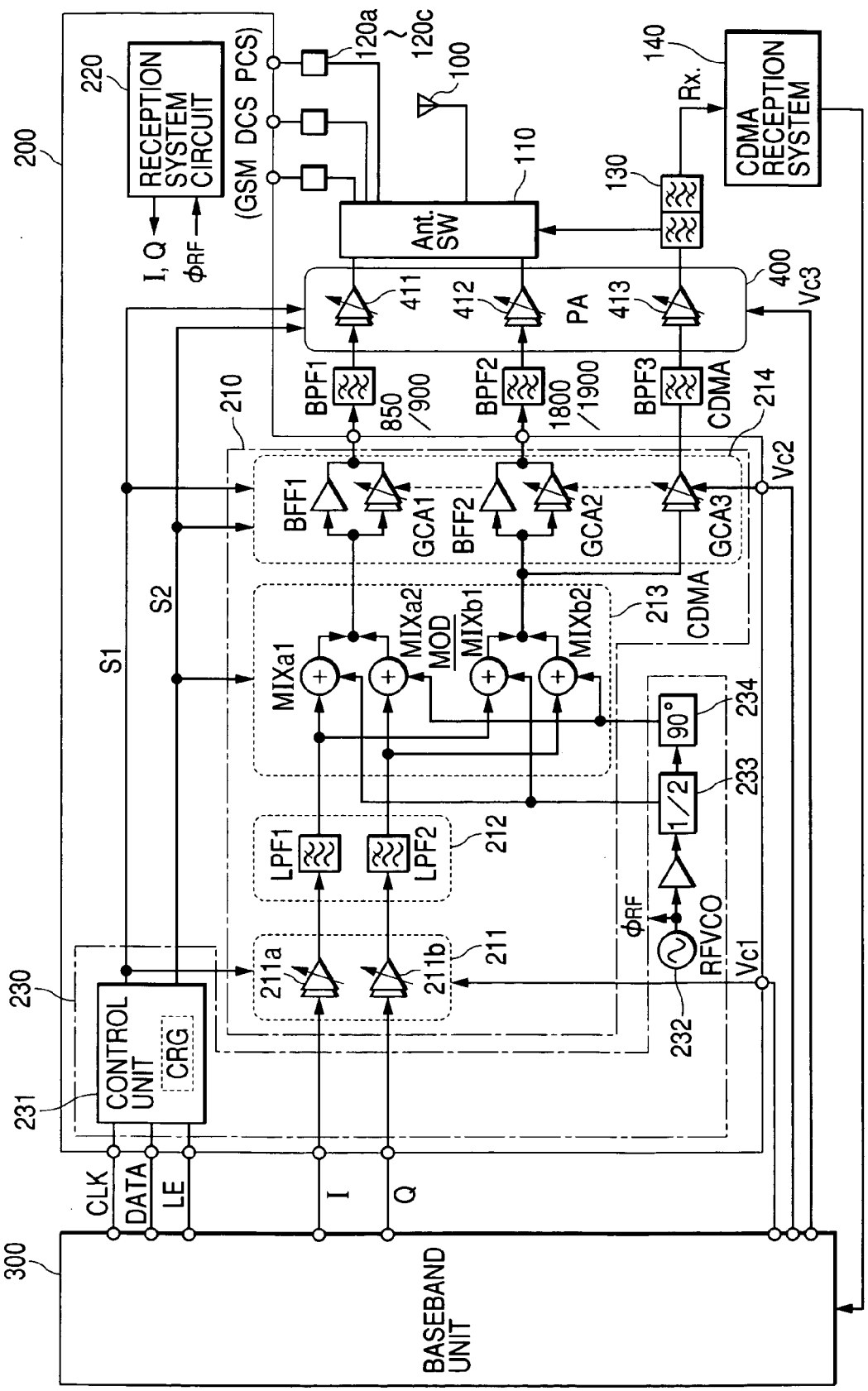
FIG. 6 is a block diagram illustrating an example of the configuration of a high frequency IC in a fourth embodiment of the present invention and a wireless communication system using it.

FIG. 6 illustrates an example of the configuration of the high frequency IC in the fourth embodiment of the present invention and a wireless communication system using it.

The high frequency IC 200 in the fourth embodiment is so constituted that it is capable of signal modulation and demodulation by WCDMA (Wideband Code Division Multiple Access) in addition to those by the communication methods for GSM850, GSM900, DCS1800, and PCS1900. The WCDMA uses spread spectrum system as multiplexing method and QPSK (Quadrature PSK) as modulation method.

To implement this, the fourth embodiment is provided with a third gain variable amplifier GCA3 in addition to the buffers BFF1 and BFF2 and the gain variable amplifiers GCA1 and GCA2 in the first embodiment. The third gain variable amplifier GCA3 is added to the second amplifying unit 214 in the stage subsequent to the modulating-frequency converting unit 213, and amplifies transmission signals modulated by CDMA. Further, the fourth embodiment is provided in the stage subsequent to the gain variable amplifier GCA3 with a band-pass filter BPF3 which passes signals in the frequency band (1920 to 1980 MHz) for CDMA.

Also, the power module 400 is additionally provided with a power amplifier 413 for CDMA. In CDMA, transmission and reception simultaneously take place. To cope with this, a duplexer 130 for separating transmission signals and reception signals from each other and a reception system circuit 140 for CDMA are provided in the stage subsequent to the power amplifier 413.

As mentioned above, in CDMA, transmission and reception are simultaneously carried out. Therefore, the transmission system circuit and the reception system circuit are generally formed over separate semiconductor chips to ensure sufficient isolation. If the transmission system circuit for CDMA and the transmission system circuit for GSM and EDGE are formed over one and the same chip for circuit sharing as in this embodiment, the following advantage is produced: reduction of a number of chips and reduction in chip size can be accomplished.

However, a challenge lies. While signals with a bandwidth of the 200 kHz are handled both in GSM mode and in EDGE mode in the first to third embodiments, signals with larger bandwidths are handled in CDMA. For this reason, in the fourth embodiment, the cut-off frequency of the low-pass filters LPF1 and LPF2 must be made higher than in the first to third embodiments. At the same time, spurious (unwanted wave) produced by controlling the gain of the gain variable amplifiers 211a and 211b in the first amplifying unit 211 must be suppressed.

Moreover, of varied spurious, especially, third harmonics are apt to enlarge in the gain variable amplifiers 211a and 211b, and these third harmonics must be suppressed. As a result, steeper filter characteristics are required. To cope with this, this embodiment is constituted as follows: for the low-pass filters LPF1 and LPF2, filters of as high an order as second or higher order are used. The cut-off frequency is changed between in GSM mode or EDGE mode and in CDMA mode by changing the value of the capacitance in the filters.

Next, an example of a circuit suitable for the low-pass filters LPF1 and LPF2 in the fourth embodiment (FIG. 6) will be described referring to FIG. 7.

The filter in this embodiment comprises the following component elements: an amplifier stage comprising a bipolar transistor TR1 and a current source CS1 for bias connected with its emitter terminal; resistors R1 and R2 connected in series between the input terminal IN and the base terminal of the transistor TR1; a capacitor C11 connected between the base terminal of the transistor TR1 and a grounding point; and a feedback capacitor C21 connected between the emitter terminal and the base terminal of the transistor TR1.

In addition to these basic component elements, the filter comprises a capacitor C12 placed in parallel with the capacitor C11; a switch SW1 in series with the capacitor C12; a capacitor C22 placed in parallel with the feedback capacitor C21; and a switch SW2 in series with the capacitor C22. The switches SW1 and SW2 are on/off controlled by a mode selection signal MODE. More specifically, the switches SW1 and SW2 are turned on in GSM mode or EDGE mode, and turned off in WCDMA mode.

Figure 8:
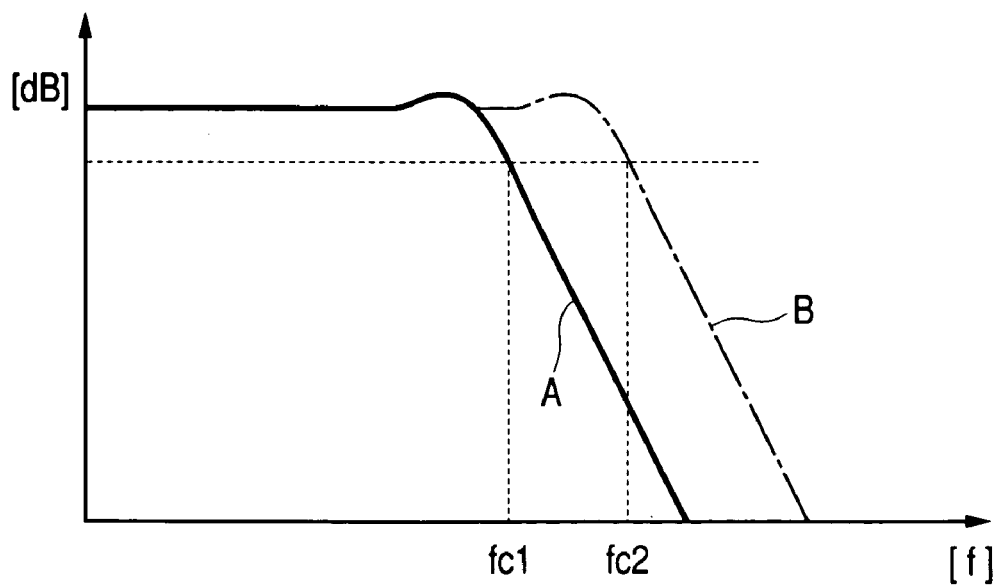
FIG. 8 is a graph plotting the frequency characteristics of the low-pass filter illustrated in FIG. 7.

In this embodiment, the resistance values of the resistors R1 and R2 are set to, for example, 5 kΩ and 5 kΩ, respectively; the capacitance values of the capacitors C11 and C21 are set to, for example, 8 pF and 32 pF, respectively; and the capacitance values of the capacitors C12 and C22 are set to, for example, 72 pF and 288 pF, respectively. Thus, when the switches SW1 and SW2 are on, the filter has such frequency characteristics as indicated by solid line A in FIG. 8, and its cut-off frequency fc1 is set to, for example, 200 kHz. When the switches SW1 and SW2 are turned off, the filter has such frequency characteristics as indicated by alternate long and short dash line B in FIG. 8, and its cut-off frequency fc2 is set to, for example, 2 MHz.

Figure 7:
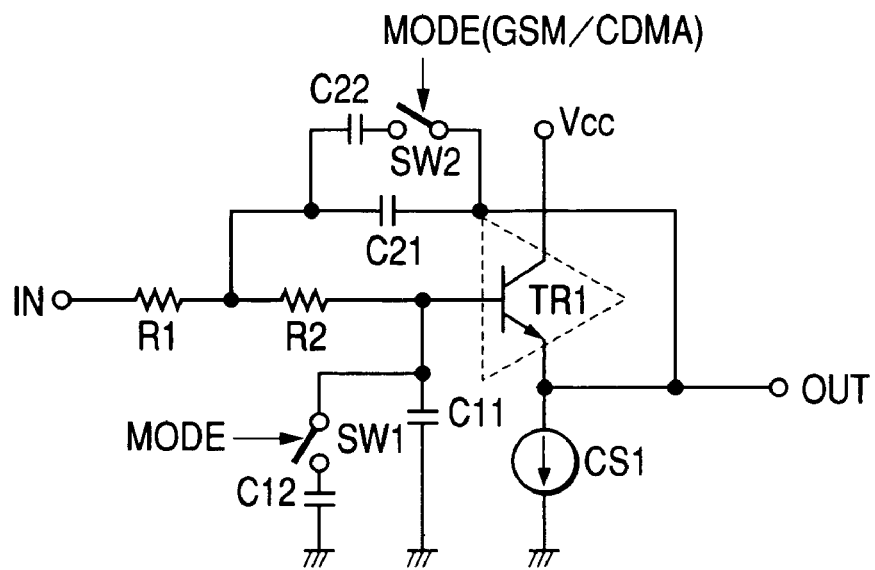
FIG. 7 is a circuit diagram illustrating an example of the constitution of a low-pass filter suitable for the fourth embodiment.

As seen if the transistor TR1 is considered as operational amplifier defined by a broken line, the filter in FIG. 7 is an active filter circuit of second order. As seen from FIG. 8 which shows its characteristics, the filter in FIG. 7 is a Butterworth filter. In this embodiment, use of an active filter having a transistor illustrated in FIG. 7 brings the following advantage: the area occupied by the filter circuit is reduced, and then the chip size of the high frequency IC 200 can be reduced. Further, use of a low-pass filter of second order sufficiently attenuates tripled waves. However, the low-pass filters LPF1 and LPF2 are not limited to a Butterworth filter of second order as illustrated in FIG. 7. They may be a filter of third or higher order, a Chebyshev filter, or the like.

Up to this point, the invention made by the inventors has been specifically described based on the embodiments. However, the present invention is not limited to the above embodiments, and may be modified in various ways to the extent that its scope is not departed from, needless to add. Some examples will be taken. In the high frequency IC 200 in the embodiments, the transmission system circuit and the reception system circuit are formed over the same semiconductor chip. Even if the transmission system circuit and the reception system circuit are formed over separate semiconductor chips, the present invention can be applied. In the above description, in the fourth embodiment (FIG. 6), filters of second or higher order are placed between the gain variable amplifier 211a and 211b and the modulating-frequency converting unit 213. Needless to add, in the first to third embodiments as well, filters of second or higher order can be effectively placed between the gain variable amplifiers 211a and 211b and the modulating-frequency converting unit 213.

The above description is made mainly with respect to the following case: the invention made by the inventors is applied to a high frequency IC for modulation and demodulation constituting a multimode wireless communication system capable of transmission and reception by four transmission methods, GSM850, GSM900, DCS, and PCS. This is the field of utilization in which the present invention has been made. However, the present invention is not limited to this, and may be utilized in other high frequency ICs for modulation and demodulation or high frequency ICs for modulation. An example is a high frequency IC constituting a dual mode wireless communication system, such as cellular phone and mobile radiophone, capable of transmission and reception by two different communication methods, GSM and DCS or GSM and PCS.

Effects produced according to the representative aspects of the present invention will be briefly described below.

According to the present invention, in a communication semiconductor integrated circuit device which comprises a gain variable amplification circuit and a modulating-frequency converting circuit and is capable of transmission in two or more different modulation modes, the following can be implemented: unwanted waves produced due to signal interference between circuits and gain control on the gain variable amplification circuit can be attenuated. Thereby, transmission signals with less distortion can be outputted. Further, leakage power to the reception band or adjacent channels can be reduced.

Further, a circuit provided with a modulating function and a frequency converting function can be used in common in transmissions in different frequency bands, and thus the chip size can be reduced. Moreover, amplitude distortion is prevented from being converted into phase distortion in a power amplification circuit in the stage subsequent to a frequency conversion circuit in GSM mode. Thus, resulting degradation in the accuracy of transmission signal can be prevented.

What is claimed is:

1. A communication semiconductor integrated circuit device comprising:
   a gain variable amplification circuit for amplifying I-signals of in-phase component and Q-signals of quadrature component with respect to fundamental wave; and
   a signal synthesis circuit for synthesizing the amplified I-signals and Q-signals and local oscillation signals to carry out modulation and frequency conversion,
   wherein said communication semiconductor integrated circuit device being capable of transmission by two or more different modulation methods,
   wherein a low-pass filter of second or higher order is provided between said gain variable amplification circuit and said signal synthesis circuit,
   wherein a second gain variable amplification circuit and an amplification circuit having a limiter function are provided in the stage subsequent to said signal synthesis circuit,
   wherein said amplification circuit having a limiter function modulated transmission signals having information in the phase component, and
   wherein said second gain variable amplification circuit amplifies modulated transmission signals having information in the phase component and in the amplitude component.

2. A communication semiconductor integrated circuit device according to claim 1,
   wherein said low-pass filter comprises a plurality of capacitive elements and a switch element connected in series with any of a plurality of the capacitive elements, and the cut-off frequency of the low-pass filter can be changed by turning on/off the switch element.

3. A communication semiconductor integrated circuit device comprising:
   a gain variable amplification circuit for amplifying I-signals and Q-signals; and
   a signal synthesis circuit for synthesizing the amplified I-signals and Q-signals and local oscillation signals to carry out modulation and frequency conversion,
   wherein said communication semiconductor integrated circuit device being capable of transmission by two or more different modulation methods,
   wherein a low-pass filter is provided between said gain variable amplification circuit and said signal synthesis circuit, and a second gain variable amplification circuit is provided in the stage subsequent to said signal synthesis circuit,
   wherein a second gain variable amplification circuit and an amplification circuit having a limiter function are provided in the stage subsequent to said signal synthesis circuit, wherein said amplification circuit having a limiter function modulated transmission signals having information in the phase component, and wherein said second gain variable amplification circuit amplifies modulated transmission signals having information in the phase component and in the amplitude component.

4. A wireless communication system comprising:

a communication semiconductor integrated circuit device comprising:

a pain variable amplification circuit for amplifying I-signals of in-phase component and Q-signals of quadrature component with respect to fundamental wave and a signal synthesis circuit for synthesizing the amplified I-signals and Q-signals and local oscillation signals to carry out modulation and frequency conversion, wherein said communication semiconductor integrated circuit device being capable of transmission by two or more different modulation methods, wherein a low-pass filter of second or higher order is provided between said pain variable amplification circuit and said signal synthesis circuit, wherein a second gain variable amplification circuit and an amplification circuit having a limiter function are provided in the stage subsequent to said signal synthesis circuit, wherein said amplification circuit having a limiter function modulated transmission signals having information in the phase component, and wherein said second gain variable amplification circuit amplifies modulated transmission signals having information in the phase component and in the amplitude component;

a signal processing semiconductor integrated circuit which generates said I-signals and g-signals supplied to the communication semiconductor integrated circuit device; and a power amplification circuit which amplifies the power of signals outputted from said communication semiconductor integrated circuit device, wherein a signal for controlling the gain of said gain variable amplification circuit is supplied from said signal processing semiconductor integrated circuit to said communication semiconductor integrated circuit device.

5. A wireless communication system comprising:

a communication semiconductor integrated circuit device comprising:

a gain variable amplification circuit for amplifying I-signals of in-phase component and Q-signals of quadrature component with respect to fundamental wave and a signal synthesis circuit for synthesizing the amplified I-signals and Q-signals and local oscillation signals to carry out modulation and frequency conversion, wherein said communication semiconductor integrated circuit device being capable of transmission by two or more different modulation methods, wherein a low-pass filter of second or higher order is provided between said gain variable amplification circuit and said signal synthesis circuit, wherein a second gain variable amplification circuit and an amplification circuit having a limiter function are provided in the stage subsequent to said signal synthesis circuit, wherein said amplification circuit having a limiter function modulated transmission signals having information in the phase component, and wherein said second gain variable amplification circuit amplifies modulated transmission signals having information in the phase component and in the amplitude component;

a signal processing semiconductor integrated circuit which generates said I-signals and Q-signals supplied to the communication semiconductor integrated circuit device; and a power amplification circuit which amplifies the power of signals outputted from said communication semiconductor integrated circuit device, wherein a signal for controlling the gain of said gain variable amplification circuit and a signal for controlling the gain of said second gain variable amplification circuit are supplied from said signal processing semiconductor integrated circuit to said communication semiconductor integrated circuit device.

* * * * *